US012683802B2

(12) United States Patent
Hu

(10) Patent No.: US 12,683,802 B2
(45) Date of Patent: *Jul. 14, 2026

(54) ELECTRONIC SIGNATURE MANAGEMENT METHOD, ELECTRONIC SIGNATURE MANAGEMENT SYSTEM, AND COMPUTER-READABLE STORAGE MEDIUM

(71) Applicant: Jinqian Hu, Hangzhou (CN)

(72) Inventor: Jinqian Hu, Hangzhou (CN)

(73) Assignee: Jinqian Hu, Hangzhou (CN)

( * ) Notice: Subject to any disclaimer, the term of this patent is extended or adjusted under 35 U.S.C. 154(b) by 110 days.

This patent is subject to a terminal disclaimer.

(21) Appl. No.: 18/262,823

(22) PCT Filed: Oct. 28, 2021

(86) PCT No.: PCT/CN2021/126957
§ 371 (c)(1),
(2) Date: Jul. 25, 2023

(87) PCT Pub. No.: WO2022/089517
PCT Pub. Date: May 5, 2022

(65) Prior Publication Data
US 2024/0267226 A1     Aug. 8, 2024

(30) Foreign Application Priority Data
Nov. 2, 2020   (CN) .......................... 202011202663.3

(51) Int. Cl.
H04L 29/06     (2006.01)
H04L 9/32     (2006.01)
H04L 9/40     (2022.01)

(52) U.S. Cl.
CPC ............ H04L 9/3247 (2013.01); H04L 9/321 (2013.01); H04L 63/0823 (2013.01)

(58) Field of Classification Search
CPC ... H04L 9/3247; H04L 9/321; H04L 63/0823; G06F 21/6218; G06F 21/16
See application file for complete search history.

(56) References Cited

U.S. PATENT DOCUMENTS 6,850,252 B1 * 2/2005 Hoffberg .............. H04N 21/475
                                           380/252
10,742,411 B2 * 8/2020 Patel .................. G06Q 20/3674
(Continued)

FOREIGN PATENT DOCUMENTS

CN        1767434 A   *   5/2006
CN     201086472        7/2008
(Continued)

OTHER PUBLICATIONS

Chinese Office Action pertaining to corresponding Chinese Patent Application No. 202011202663.3 mailed Jul. 27, 2022.
(Continued)

*Primary Examiner* — Sher A Khan
(74) *Attorney, Agent, or Firm* — Ming Jiang; OPENPTO US LLC

(57) ABSTRACT

An electronic signature management method, an electronic signature management system and a computer-readable storage medium are provided. The method includes the following steps: acquiring a plurality pieces of personal identity information and a plurality of corresponding digital certificates; generating a plurality of personal digital signatures according to the plurality of pieces of personal identity information and the plurality of corresponding digital certificates; and generating a composite personal digital signature according to the plurality of personal digital signatures, where the composite personal digital signature includes the plurality of pieces of personal identity information and the plurality of corresponding digital certificates. The composite personal digital signature or composite common digital (Continued)

acquiring a plurality of pieces of personal identity information and a plurality of corresponding digital certificates     S110 generating a plurality of personal digital signatures according to the plurality of pieces of personal identity information and the plurality of corresponding digital certificates     S120 generating a composite personal digital signature according to the plurality of personal digital signatures, where the composite personal digital signature includes the plurality of pieces of personal identity information and the plurality of corresponding digital certificates     S130 signature of the present disclosure can acquire the authorizations/authentications of all the people or organizations in a fastest and most convenient manner.

9 Claims, 13 Drawing Sheets

(56)                    References Cited

U.S. PATENT DOCUMENTS

| | | | | |
|---|---|---|---|---|
| 11,770,368 | B2 * | 9/2023 | Bowman | H04L 9/3247 713/153 |
| 2003/0097565 | A1 * | 5/2003 | Wheeler | H04L 63/083 713/171 |
| 2012/0278625 | A1 * | 11/2012 | Narayanan | H04L 9/006 713/175 |
| 2015/0109214 | A1 * | 4/2015 | Shi | G06F 3/04166 345/173 |
| 2017/0140174 | A1 * | 5/2017 | Lacey | G06Q 20/4016 |
| 2018/0034641 | A1 * | 2/2018 | Tiwari | H04L 63/0807 |
| 2018/0349676 | A1 * | 12/2018 | Gibson | G06V 40/30 |
| 2021/0006417 | A1 * | 1/2021 | Pala | H04L 9/3247 |
| 2021/0081557 | A1 * | 3/2021 | Thomson-Wood | G06F 21/6218 |
| 2021/0306156 | A1 * | 9/2021 | Madineni | H04L 9/321 |
| 2022/0188449 | A1 * | 6/2022 | Chugunov | G06F 21/602 |

FOREIGN PATENT DOCUMENTS

| | | | | |
|---|---|---|---|---|
| CN | 102663324 A | | 9/2012 | |
| CN | 108776887 A | * | 11/2018 | |
| CN | 108964925 A | | 12/2018 | |
| CN | 109117707 A | * | 1/2019 | G06V 40/172 |
| CN | 109328351 A | * | 2/2019 | G06F 15/161 |
| CN | 109510709 A | | 3/2019 | |
| CN | 111144855 A | | 5/2020 | |
| CN | 111262710 A | * | 6/2020 | H04L 9/0869 |
| CN | 111316278 A | * | 6/2020 | H04L 9/50 |
| CN | 111368339 A | | 7/2020 | |
| CN | 112257110 A | | 1/2021 | |
| CN | 110809253 B | * | 3/2023 | H04W 12/009 |
| CN | 118427856 A | * | 8/2024 | |
| JP | 2003169051 A | | 6/2003 | |
| JP | 2015195580 A | | 11/2015 | |
| JP | 6494004 B1 | * | 4/2019 | |
| KR | 20100111194 A | * | 10/2010 | H04W 88/02 |
| WO | WO-2013123548 A2 | * | 8/2013 | G06F 21/6218 |

OTHER PUBLICATIONS

International Search Report and Written Opinion pertaining to PCT/CN2021/126957, mailed Jan. 26, 2022.

* cited by examiner

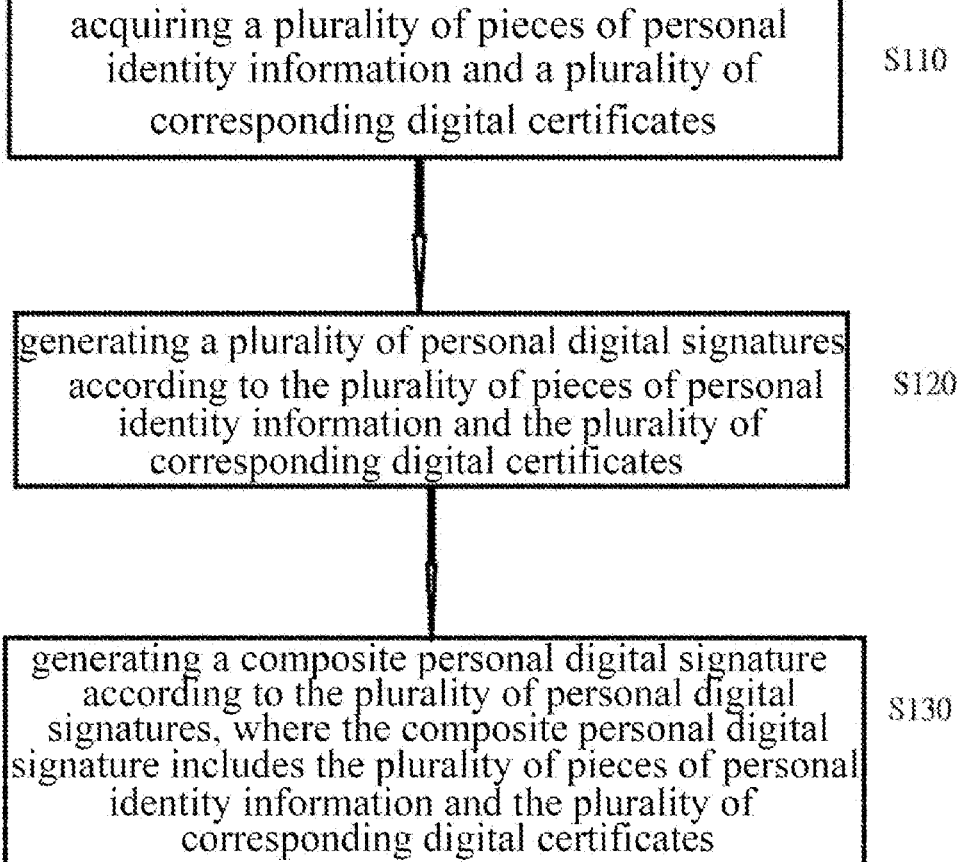

acquiring a plurality of pieces of personal identity information and a plurality of corresponding digital certificates — S110 generating a plurality of personal digital signatures according to the plurality of pieces of personal identity information and the plurality of corresponding digital certificates — S120 generating a composite personal digital signature according to the plurality of personal digital signatures, where the composite personal digital signature includes the plurality of pieces of personal identity information and the plurality of corresponding digital certificates — S130

FIG. 10

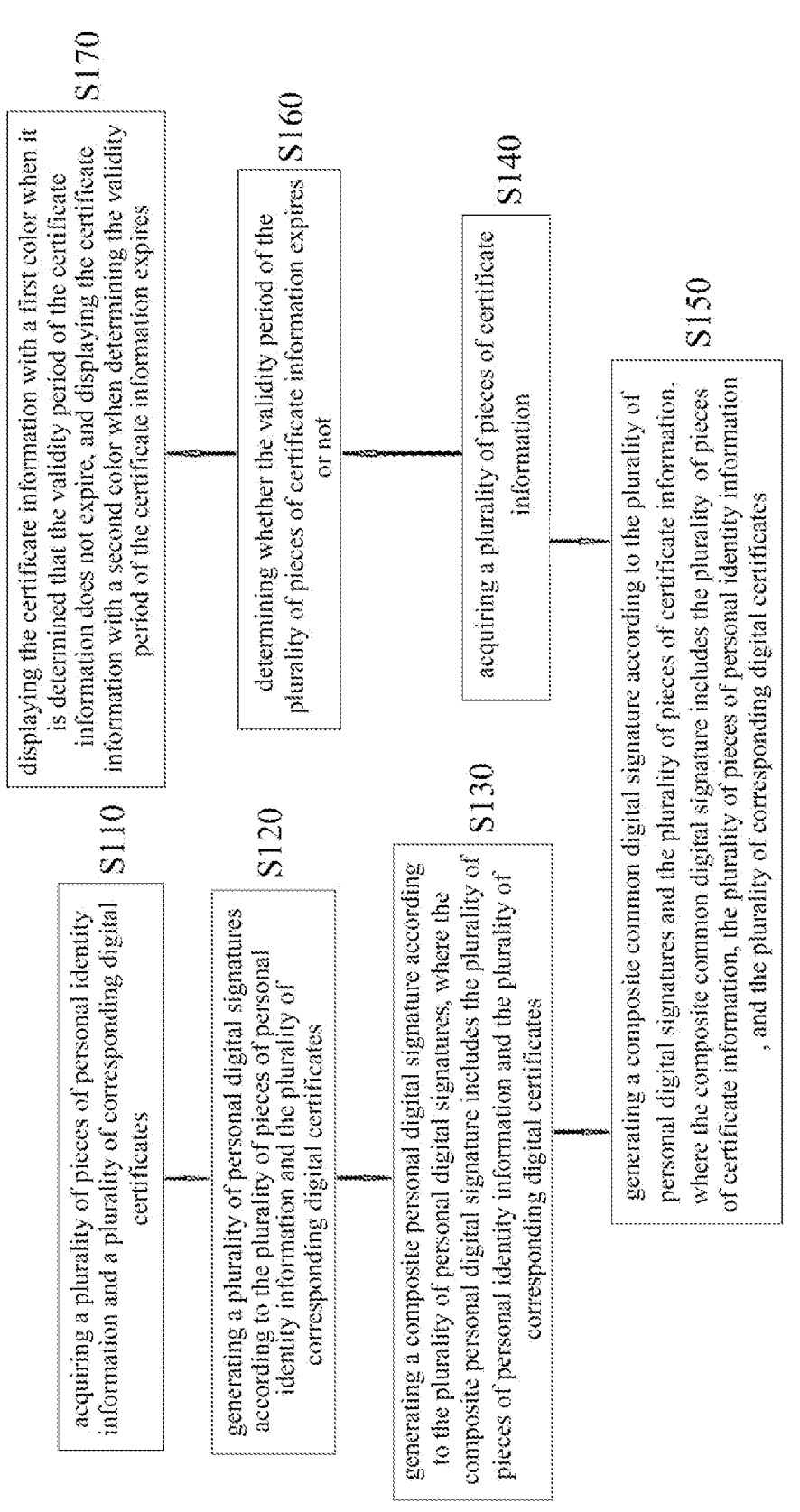

acquiring a plurality of pieces of personal identity information and a plurality of corresponding digital certificates S110 generating a plurality of personal digital signatures according to the plurality of pieces of personal identity information and the plurality of corresponding digital certificates S120 generating a composite personal digital signature according to the plurality of personal digital signatures, where the composite personal digital signature includes the plurality of pieces of personal identity information and the plurality of corresponding digital certificates S130 acquiring a plurality of pieces of certificate information S140 generating a composite common digital signature according to the plurality of personal digital signatures and the plurality of pieces of certificate information, where the composite common digital signature includes the plurality of pieces of certificate information, the plurality of pieces of personal identity information, and the plurality of corresponding digital certificates S150 determining whether the validity period of the plurality of pieces of certificate information expires or not S160 displaying the certificate information with a first color when it is determined that the validity period of the certificate information does not expire, and displaying the certificate information with a second color when determining the validity period of the certificate information expires S170

FIG. 12

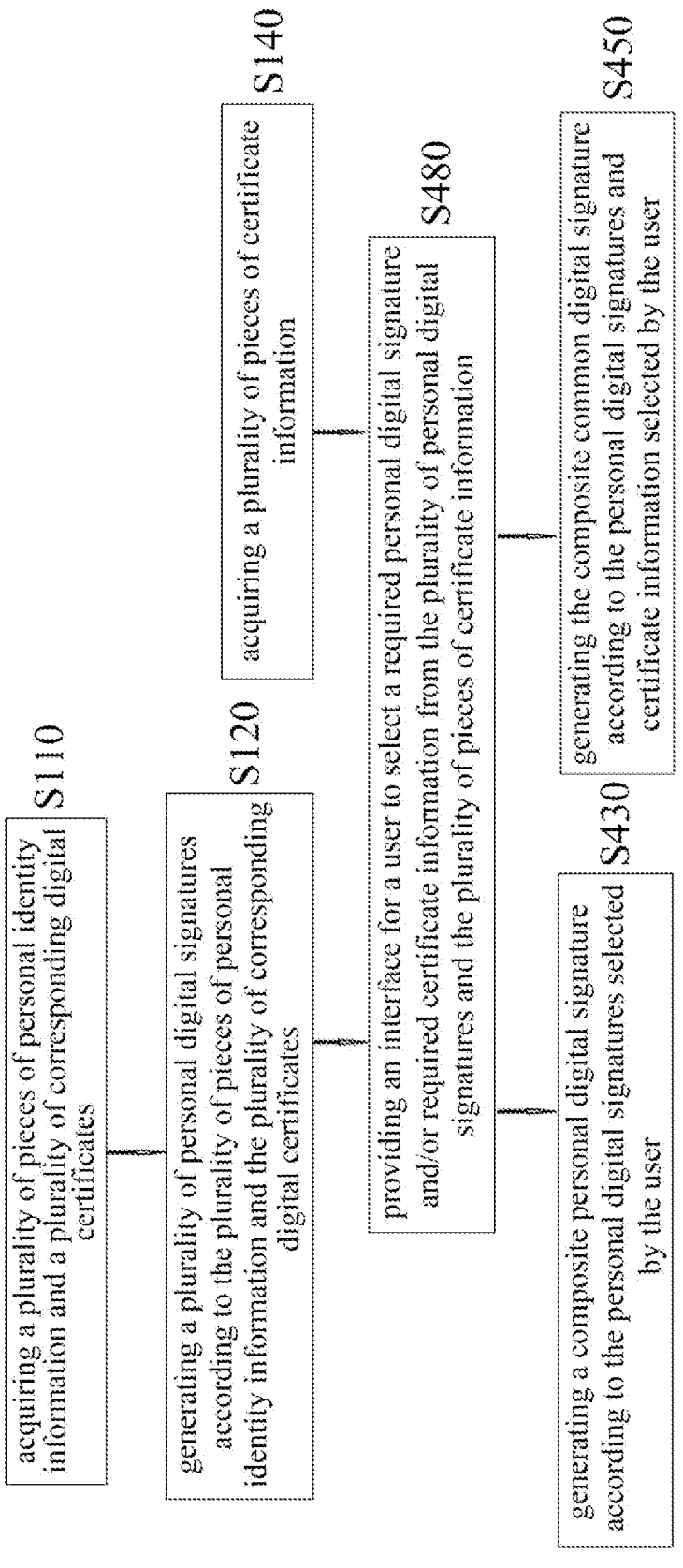

acquiring a plurality of pieces of personal identity information and a plurality of corresponding digital certificates    S110 generating a plurality of personal digital signatures according to the plurality of pieces of personal identity information and the plurality of corresponding digital certificates    S120 providing an interface for a user to select a required personal digital signature and/or required certificate information from the plurality of personal digital signatures and the plurality of pieces of certificate information    S430 acquiring a plurality of pieces of certificate information    S140 generating a composite personal digital signature according to the personal digital signatures selected by the user    S480 generating the composite common digital signature according to the personal digital signatures and certificate information selected by the user    S450

FIG. 13

ELECTRONIC SIGNATURE MANAGEMENT METHOD, ELECTRONIC SIGNATURE MANAGEMENT SYSTEM, AND COMPUTER-READABLE STORAGE MEDIUM

CROSS REFERENCE TO RELATED APPLICATION

This patent application is a national stage of International Application No. PCT/CN2021/126957, filed on Oct. 28, 2021, which claims the benefit and priority of Chinese Patent Application No. 2020112026633 filed to China National Intellectual Property Administration on Nov. 2, 2020 and entitled as "ELECTRONIC SIGNATURE MANAGEMENT METHOD, ELECTRONIC SIGNATURE MANAGEMENT SYSTEM, AND COMPUTER-READABLE STORAGE MEDIUM". Both of the aforementioned applications are incorporated by reference herein in their entireties as part of the present application.

TECHNICAL FIELD

The present disclosure relates to the technical field of information security, and in particular, to an electronic signature management method, an electronic signature management system, and a computer-readable storage medium.

BACKGROUND

With the rapid development of Internet technologies and the flourishing of e-commerce, electronic signature technology has emerged and has been widely used. To stamp an electronic signature can effectively prevent electronic files from being falsified. However, electronic signature is generally saved in servers of several specific service agencies for centralized management at present. Once in the servers of the service agencies occurs security vulnerability, a large number of electronic signature information may leak, and this may cause numerous security issues. Moreover, individuals or enterprises cannot effectively supervise and control the usage of their own electronic signatures.

Furthermore, in many cases, it is desired that authorizations/authentications of many people or organizations be provided on an authorization or a certificate. However, if these people or organizations happen to be located in different remote regions, it is very difficult to get authorizations/authentications of these people or organizations simultaneously.

Therefore, it is urgent for those skilled in the art to research and develop a more convenient intelligent electronic signature management method and system capable of effectively solving security risk, thereby addressing challenges for electronic signature management for individuals or enterprises, and meeting the rapid development demands of modern e-commerce.

It should be noted that the above background portion is provided just for convenience of clearly and completely describing technical solutions of the present disclosure, and for helping those skilled in the art understand the present disclosure. The above technical solutions cannot be considered well-known to those skilled in the art solely because they are elaborated in the background of the present disclosure.

SUMMARY

To overcome the shortcomings in the prior art, embodiments of the present disclosure provide an electronic signature management method, an electronic signature management system, and a computer-readable storage medium.

An embodiment of the disclosure discloses an electronic signature management method, including the following steps:

acquiring a plurality of pieces of personal identity information and a plurality of corresponding digital certificates; generating a plurality of personal digital signatures according to the plurality of pieces of personal identity information and the plurality of corresponding digital certificates; and generating a composite personal digital signature according to the plurality of personal digital signatures, wherein the composite personal digital signature includes the plurality of pieces of personal identity information and the plurality of corresponding digital certificates.

Further, the plurality of pieces of personal identity information includes biological feature information, identity card information, telephone number information, personal signature information, social insurance information, credit investigating information, and/or personal photo information of a user.

Further, the method further includes: acquiring a plurality of pieces of certificate information, and generating a composite common digital signature according to the plurality of personal digital signatures and the plurality of pieces of certificate information, where the composite common digital signature includes the plurality of pieces of certificate information, the plurality of pieces of personal identity information, and the plurality of corresponding digital certificates.

Further, the plurality of pieces of certificate information includes important information in business operation selected from the group consisting of electronic license information, tax-control information, juridical person identity information, shareholder information, social insurance information, annual inspection information, team information, intellectual property information, enterprise credit investigating information.

Further, the plurality of pieces of certificate information is authenticated and sent by a plurality of corresponding certificate authority servers, and the plurality of pieces of certificate information includes a corresponding timestamp and a validity period.

Further, the method further includes: determining whether the validity period of the plurality of pieces of certificate information expires or not; and displaying the certificate information with a first color when it is determined that the validity period of the certificate information does not expire, and displaying the certificate information with a second color when it is determined that the validity period of the certificate information expires.

Further, the method further includes: providing a user with an interface to select a required personal digital signature and/or required certificate information from the plurality of personal digital signatures and the plurality of pieces of certificate information; and generating the composite personal digital signature and/or the composite common digital signature according to the personal digital signature and/or the certificate information selected by the user.

Further, the method further includes: providing a central control module, and a communication module, an identity authentication module, a secret key module, and a storage module that are connected to the central control module;

achieving communication with a user and an external server using the communication module;

storing the plurality of pieces of personal identity information using the identity authentication module, authenticating identity information input by the user using the stored plurality of pieces of personal identity information, and authorizing the user if the authentication succeeds;

storing the plurality of pieces of certificate information and secret keys authorized by a banking system and/or a government system using the secret key module;

storing the plurality of personal digital signatures, the composite personal digital signature, and the composite common digital signature using the storage module; and receiving an input and controlling operations of other modules using the central processing module, and allowing, after the user is authorized, the user to use the plurality of personal digital signatures, the composite personal digital signature, and/or the composite common digital signature from the storage module.

Further, for the composite personal digital signature, if a first portion of the plurality of digital certificates is sealed and a second portion thereof is opened for consent in an application layer, this indicates that people in the first portion do not consent and people in the second portion consent; and if all the plurality of digital certificates are opened for consent in the application layer, this indicates that all the people in the first portion and in the second portion consent. For the composite common digital signature, if a first portion of the plurality of digital certificates is sealed and a second portion thereof is opened for consent in an application layer, this indicates that people in the first portion do not consent and people in the second portion consent; if all the plurality of digital certificates are opened for consent in the application layer, this indicates that all people in the first portion and in the second portion consent; if a third portion of the plurality of pieces of certificate information is sealed and a fourth portion thereof is opened for consent in the application layer, this indicates that certificate information in the third portion is not valid and certificate information in the fourth portion is valid; and if all the certificate information are opened for consent in the application layer, this indicates that all the certificate information are valid.

An embodiment of the disclosure discloses an electronic signature management system, including:

an acquisition module, configured to acquire a plurality of pieces of personal identity information and a plurality of corresponding digital certificates;

a personal digital signature generation module, configured to generate a plurality of personal digital signatures according to the plurality of pieces of personal identity information and the plurality of corresponding digital certificates; and a composite personal digital signature generation module, configured to generate a composite personal digital signature according to the plurality of personal digital signatures, where the composite personal digital signature comprises the plurality of pieces of personal identity information and the plurality of corresponding digital certificates.

Further, the plurality of pieces of personal identity information includes biological feature information, identity card information, telephone number information, personal signature information, social insurance information, credit investigating information, and/or personal photo information of a user.

Further, the electronic signature management system further includes: a certificate information acquisition module, configured to acquire a plurality of pieces of certificate information; and a composite common digital signature generation module, configured to generate a composite common digital signature according to the plurality of personal digital signatures and the plurality of pieces of certificate information, wherein the composite common digital signature includes the plurality of pieces of certificate information, the plurality of pieces of personal identity information, and the plurality of corresponding digital certificates.

Further, the plurality of pieces of certificate information include important information in business operation selected from the group consisting of electronic license information, tax-control information, juridical person identity information, shareholder information, social insurance information, annual inspection information, team information, intellectual property information, and enterprise credit investigating information.

Further, the plurality of pieces of certificate information is authenticated and sent by a plurality of corresponding certificate authority servers, and the plurality of pieces of certificate information includes a corresponding timestamp and a validity period.

Further, the electronic signature management system further includes: a certificate validity period confirmation module, configured to confirm whether the validity period of the plurality of pieces of certificate information expires or not; and a display module, configured to display the certificate information with a first color if the certificate validity period confirmation module determines that the validity period of the certificate information does not expire, and display the certificate information with a second color if the certificate validity period confirmation module determines that the validity period of the certificate information expires.

Further, the electronic signature management system according further includes: a selection module, configured to provide a user an interface to select a required personal digital signature and/or required certificate information from the plurality of personal digital signatures and the plurality of pieces of certificate information, and to transfer the required personal digital signature and/or the required certificate information to the composite personal digital signature generation module and the composite common digital signature generation module; where the composite personal digital signature generation module and/or the composite common digital signature generation module generate/generates the composite personal digital signature and/or the composite common digital signature according to the personal digital signature and/or the certificate information selected by the user.

Further, the electronic signature management system further includes:

a central control module, a communication module, an identity authentication module, a secret key module, and a storage module that are connected to the central control module;

the communication module, configured to achieve communication with a user and an external server;

the identity authentication module, configured to store the plurality of pieces of personal identity information, authenticate identity information input by the user using the plurality of pieces of personal identity information, and authorize the user if the authentication succeeds;

the secret key module, configured to store the plurality of pieces of certificate information and secret keys authorized by a banking system and/or a government system;

the storage module, configured to store the plurality of personal digital signatures, the composite personal digital signature and the composite common digital signature; and the central processing module, configured to receive an input and control operations of other modules, and to allow the user to use the plurality of personal digital signatures, the composite personal digital signature, and/or the composite common digital signature from the storage module after the user is authorized.

Further, for the composite personal digital signature, if a first portion of the plurality of digital certificates is sealed up and a second portion thereof is opened for consent in an application layer, this indicates that people in the first portion do not consent and people in the second portion consent; and if all the plurality of digital certificates are opened for consent in the application layer, this indicates that all people in the first portion and in the second portion consent. For the composite common digital signature, if a first portion of the plurality of digital certificates is sealed up and a second portion thereof is opened for consent in an application layer, this indicates that people in the first portion do not consent and people in the second portion consent; if all the plurality of digital certificates are opened for consent in the application layer, this indicates that all people in the first portion and in the second portion consent; if a third portion of the plurality of pieces of certificate information is sealed up and a fourth portion thereof is opened for consent in the application layer, this indicates that certificate information in the third portion is not valid and certificate information in the fourth portion is valid; and if all the certificate information are opened for consent in the application layer, this indicates that all the certificate information are valid.

An embodiment of the disclosure provides a computer-readable storage medium, storing a computer program thereon, wherein, when executed by a processor, the computer program implements the method according to any of the above solutions.

By means of the above technical solutions, the present disclosure has the following beneficial effects: an individual or enterprise's electronic signature may be saved in a platform or a cloud server of an electronic signature management system; moreover, the electronic signature management system is not centralized managed, which may greatly reduce the risk of information leakage of the electronic signature and brings high security level. In this way, individuals or enterprises may readily supervise the usage of their own electronic signatures effectively. Furthermore, individuals or enterprises may get access to the platform or cloud server of the electronic signature management system via a terminal, and then may use the electronic signature readily after being authenticated; especially when it is required that authorizations/authentications of multiple people or organizations be provided on a written authorization or authentication, the composite personal digital signature or the composite common digital signature of the present disclosure may acquire the authorizations/authentications of all the people or organizations in a fastest and most convenient manner, thereby solving the problem of electronic signature management for individuals or enterprises, and meeting the rapid development demands for modern e-commerce. Moreover, the composite personal digital signature and the composite common digital signature of the disclosure may not only be combined together for use, but also be used separately, thereby achieving the purpose of double application.

To make the above and other objectives, features, and advantages of the present disclosure clearer and more understandable, the following provides a detailed description by way of preferred embodiments and in combination with accompanying drawings.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and those skilled in the art may obtain other drawings from these accompanying drawings without creative efforts.

FIG. 10 is a flow chart showing an electronic signature management method in the first embodiment of the present disclosure;

FIG. 12 is a flow chart showing an electronic signature management method in the third embodiment of the present disclosure; and FIG. 13 is a flow chart showing an electronic signature management method in the fourth embodiment of the present disclosure.

Figure 1:
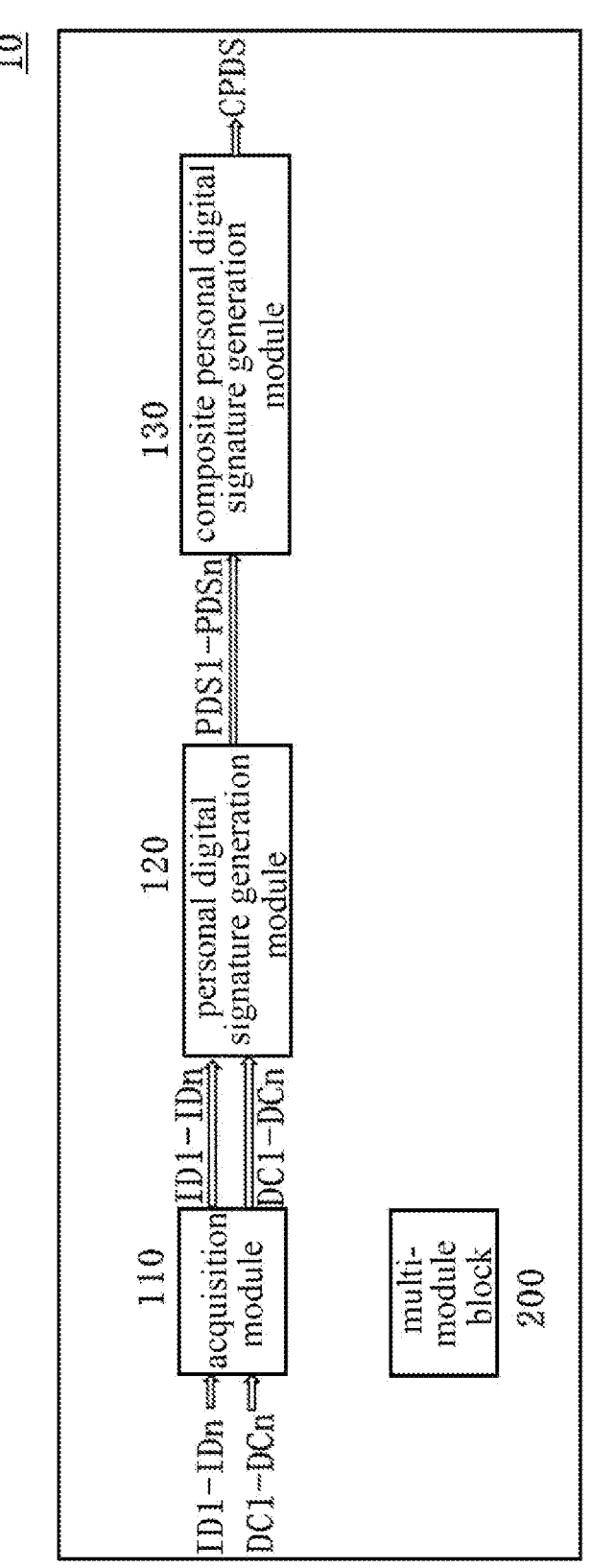
FIG. 1 is a frame diagram showing an electronic signature management system in the first embodiment of the present disclosure.

REFERENCE NUMERALS 10, 20, 30, and 40: electronic signature management system; 110: acquisition module; 120: personal digital signature generation module; 130 and 430: composite personal digital signature generation module; 140: certificate information acquisition module; 150 and 450: composite common digital signature generation module; 160: certificate validity period confirmation module; 170: display module; 480: selection module; 200: multi-module block; 210: central control module; 220: communication module; 230: identity authentication module; 240: secret key module; 250: storage module; ID1-IDn: personal identity information; DC1-DCn: digital certificate; PDS1-PDSn and PDS': personal digital signature; CPDS: composite personal digital signature; CI1-CIm and CI': certificate information; CCDS: composite common digital signature; S110-S170, S430, S450, and S480: steps.

DETAILED DESCRIPTION OF THE EMBODIMENTS

The technical solutions of the embodiments of the present disclosure are clearly and completely described below with reference to the drawings in embodiments of the present disclosure. Apparently, the described embodiments are merely a part rather than all of the embodiments of the present disclosure. All other embodiments obtained by those skilled in the art based on the embodiments of the present disclosure without creative efforts also fall within the protection scope of the present disclosure.

It should be noted that, in the description of the present disclosure, terms "first" and "second" are merely used for description and used to distinguish similar objects, with no order between them, and shall not be understood as indication or implication of relative importance. Moreover, in the description of the present disclosure, unless otherwise specified, "a plurality of" means two or more.

Referring to FIG. 1, FIG. 1 is a frame diagram showing an electronic signature management system in the first embodiment of the present disclosure. As shown in FIG. 1, the electronic signature management system 10 includes an acquisition module 110, a personal digital signature generation module 120 and a composite personal digital signature generation module 130. The acquisition module 110 is configured to acquire a plurality of pieces of personal identity information ID1-IDn and a plurality of corresponding digital certificates DC1-DCn. The personal digital signature generation module 120 is configured to generate a plurality of personal digital signatures PDS1-PDSn according to the plurality of pieces of personal identity information ID1-IDn and the plurality of corresponding digital certificates DC1-DCn. The composite personal digital signature generation module 130 is configured to generate a composite personal digital signature CPDS according to the plurality of personal digital signatures PDS1-PDSn, where the composite personal digital signature CPDS includes the plurality of pieces of personal identity information ID1-IDn and the plurality of corresponding digital certificates DC1-DCn.

For example, for husband and wife in a family, the personal digital signature generation module 120 may generate the husband's personal digital signature PDS1 according to his personal identity information ID1 and corresponding digital certificate DC1, and may generate the wife's personal digital signature PDS2 according to her personal identity information ID2 and corresponding digital certificate DC2, and finally, the composite personal digital signature generation module 130 may generate a composite personal digital signature CPDS according to their personal digital signatures PDS1 and PDS2. If an authorization or electronic file needs authorization only from one of the husband and wife, it suffices to stamp with the husband or wife's personal digital signature PDS1/PDS2. If an authorization or electronic file needs authorization from both of husband and wife, it may be stamped with the composite personal digital signature CPDS, where the CPDS includes the personal identity information ID1 and ID2, and the corresponding digital certificates DC1 and DC2 of the husband and wife. For another example, a family may include husband, wife and four children, the personal identity information ID1-ID6 and corresponding digital certificates DC1-DC6 of the six people may be used to generate respective personal digital signatures PDS1-PDS6, respectively, and finally, the composite personal digital signature generation module 130 generates a composite personal digital signature CPDS according to their personal digital signatures PDS1-PDS6.

It should be noted that the CPDS described above may be used alone or combined together for use. For the CPDS, if a first portion of the plurality of digital certificates DC1-DCn is sealed up and a second portion thereof is opened for consent in an application layer, it represents that people in the first portion do not consent and people in the second portion consent; if all the plurality of digital certificates DC1-DCn are opened for consent in the application layer, it represents that all the people in the first portion and in the second portion consent. For instance, if the CPDS includes the husband and wife's identity information ID1 and ID2, and the corresponding digital certificates DC1 and DC2, the husband's digital certificate DC1 (or wife's digital certificate DC2) may be sealed up in an application layer, it represents that the husband (or wife) does not consent, namely, only one consents. If husband's digital certificate DC1 and wife's digital certificate DC2 are both opened for consent in the application layer, it represents that both consent. In this way, a double application for the CPDS of separated use or use by combination may be achieved.

It should be noted that the personal identity information ID1-IDn described above may include biological feature information, identity card information, telephone number information, personal signature information, social insurance information, credit investigating information, and/or personal photo information of a user.

Figure 2:
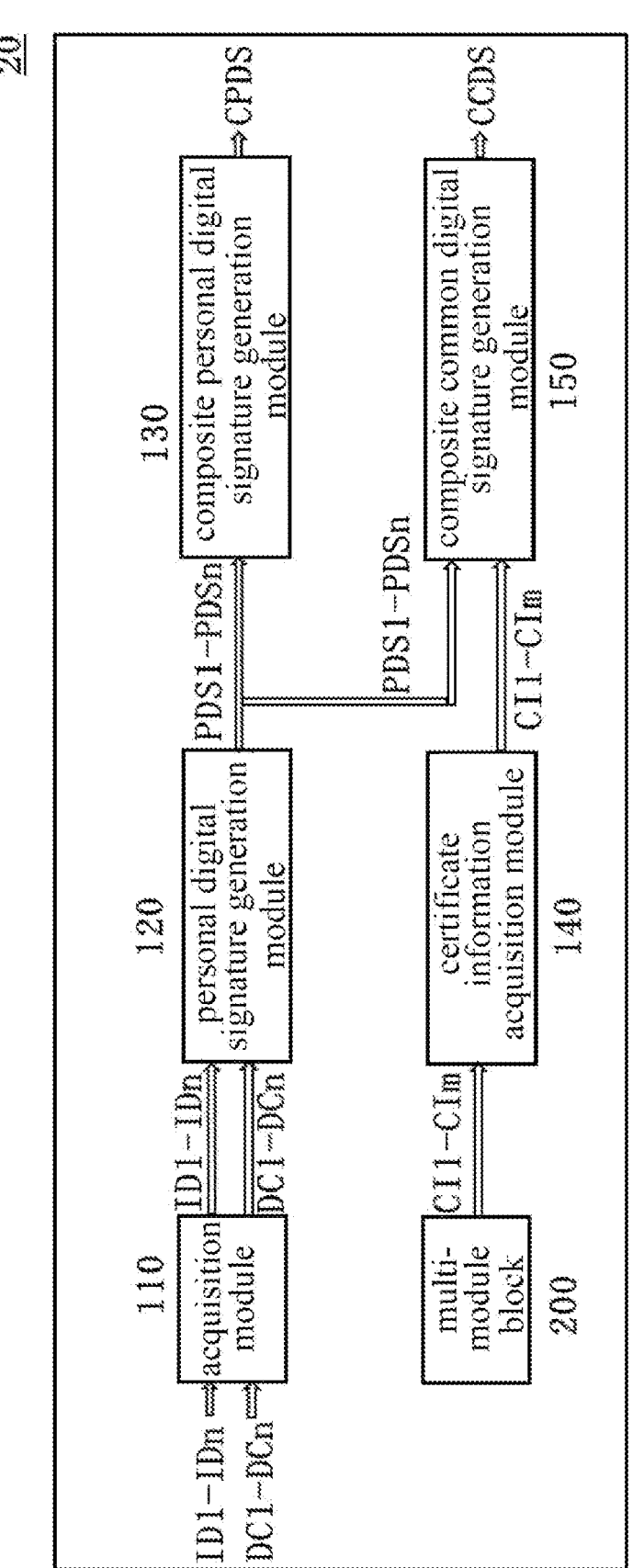
FIG. 2 is a frame diagram showing an electronic signature management system in the second embodiment of the present disclosure.

Referring to FIG. 2, FIG. 2 is a frame diagram showing an electronic signature management system in the second embodiment of the present disclosure. As shown in FIG. 2, the electronic signature management system 20 includes an acquisition module 110, a personal digital signature generation module 120, a composite personal digital signature generation module 130, a certificate information acquisition module 140, and a composite common digital signature generation module 150. The acquisition module 110, the personal digital signature generation module 120, and the composite personal digital signature generation module 130 in FIG. 2 have the same functions as those of the same modules in FIG. 1, which are thus not described any more here. The certificate information acquisition module 140 is configured to acquire a plurality of pieces of certificate information CI1-CIm. The composite common digital signature generation module 150 is configured to generate a composite common digital signature CCDS according to the plurality of personal digital signatures PDS1-PDSn and the plurality of pieces of certificate information CI1-CIm, where the composite common digital signature CCDS includes a plurality of pieces of certificate information CI1-CIm, a plurality of pieces of personal identity information ID1-IDn, and a plurality of corresponding digital certificates DC1-DCn.

For instance, there are seven shareholders in a company, the personal digital signature generation module 120 may generate the personal digital signatures PDS1-PDS7 of the seven shareholders according to their personal identity information ID1-ID7 and the corresponding digital certificates DC1-DC7, and afterwards, the composite common digital signature generation module 150 generates a composite common digital signature CCDS jointly according to the seven shareholders' personal digital signatures PDS1-PDS7, the company's electronic business license, and various electronic licenses (namely, a plurality of pieces of certificate information CI1-CIm). In other words, the composite common digital signature CCDS includes the company's electronic business license, various electronic licenses and the seven shareholders' personal identity information, which are combined to generate the company's common digital signature. It should be noted that the composite common digital signature CCDS described above may be used alone or combined for use. For the composite common digital signature CCDS, if a first portion of the plurality of digital certificates DC1-DCn is sealed up and a second portion thereof is opened for consent in an application layer, it represents that people in the first portion do not consent and people in the second portion consent; if all the plurality of digital certificates DC1-DCn are opened for consent in the application layer, it represents that all the people in the first portion and in the second portion consent. Similarly, the composite common digital signature CCDS further includes a plurality of pieces of certificate information CI1-CIm. If a third portion of the plurality of pieces of certificate information CI1-CIm is sealed up and a fourth portion thereof is opened for consent in the application layer, it represents that certificate information in the third portion is not valid and certificate information in the fourth portion is valid; and if all the certificate information CI1-CIm are opened for consent in the application layer, it represents that all the certificate information CI1-CIm are valid.

For instance, if the composite common digital signature CCDS includes seven shareholders' identity information ID1-ID7, and corresponding digital certificates DC1-DC7, six shareholders' digital certificates DC1-DC6 may be sealed up in the application layer, indicating that the six shareholders do not consent, namely, only one shareholder consents. If the seven shareholders' digital certificates DC1-DC7 are all opened for consent in the application layer, it reflects that the seven shareholders consent. In this way, a double application for the composite common digital signature CCDS of separate use or use in combination may be achieved. Similarly, the composite common digital signature CCDS further includes a company's electronic business license, and various electronic licenses (namely, a plurality of pieces of certificate information CI1-CIm). If the certificate information CI2-CIm are sealed up in the application layer, it represents that these certificate information CI2-CIm are not valid, and only certificate information CI1 is valid. If all the certificate information CI1-CIm are opened for consent in the application layer, all the certificate information CI1-CIm are valid. In this way, a double application for the composite common digital signature CCDS of separate use or use in combination may be achieved.

It should be noted that the plurality of pieces of certificate information CI1-CIm may include electronic license information, tax-control information, juridical person identity information, shareholder information, social insurance information, annual inspection information, team information, intellectual property information, business credit investigating information, and other important information in business operation.

Further, the plurality of pieces of certificate information CI1-CIm are authenticated and sent by a plurality of corresponding Certificate Authority (CA) servers, and the plurality of pieces of certificate information CI1-CIm include corresponding timestamps and validity period.

Figure 3:
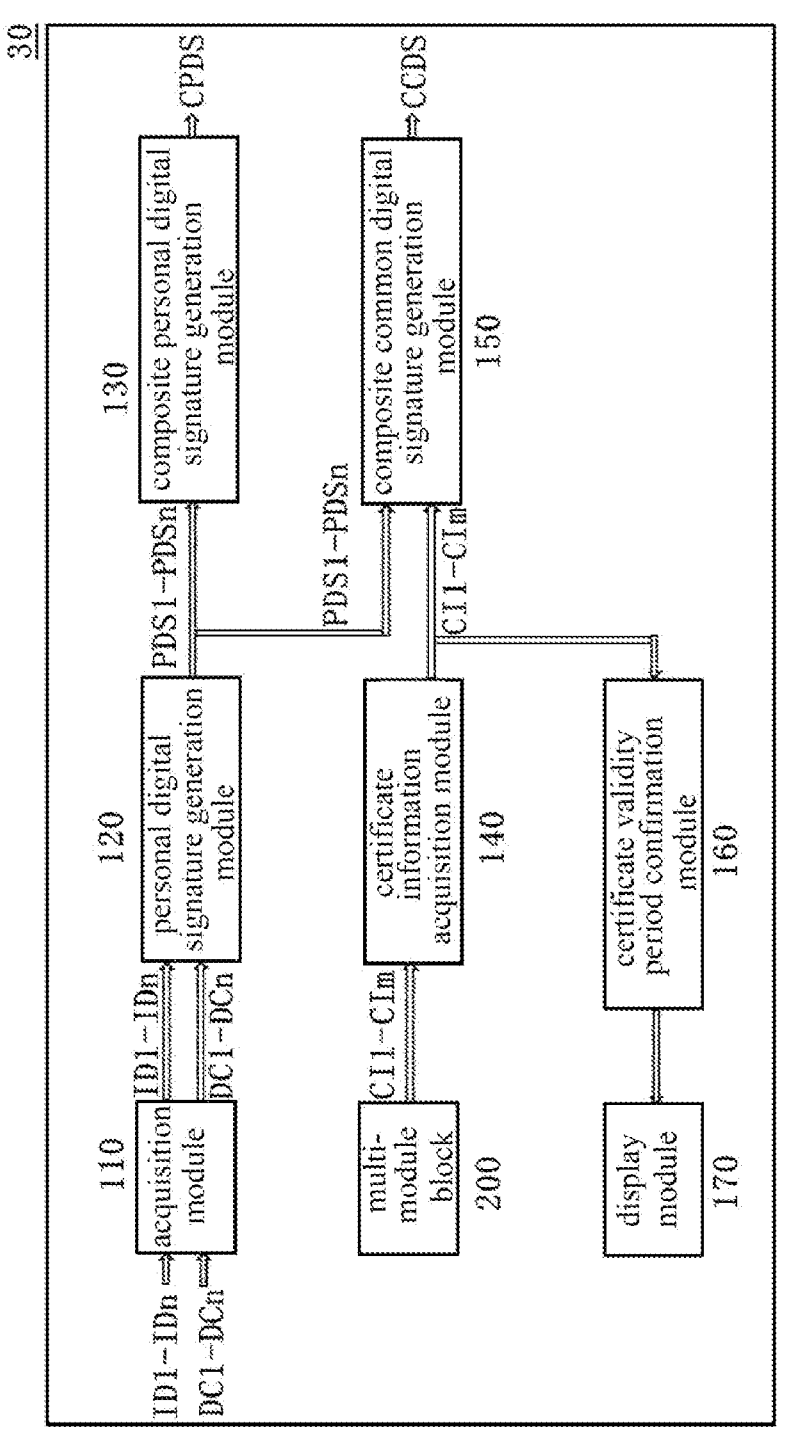
FIG. 3 is a frame diagram showing an electronic signature management system in the third embodiment of the present disclosure.

Referring to FIG. 3, FIG. 3 is a frame diagram showing an electronic signature management system in the third embodiment of the present disclosure. As shown in FIG. 3, the electronic signature management system 30 includes: an acquisition module 110, a personal digital signature generation module 120, a composite personal digital signature generation module 130, a certificate information acquisition module 140, a composite common digital signature generation module 150, a certificate validity period confirmation module 160, and a display module 170. The acquisition module 110, the personal digital signature generation module 120, the composite personal digital signature generation module 130, the certificate information acquisition module 140, and the composite common digital signature generation module 150 in FIG. 3 have the same functions as those of the same modules in FIG. 2, which are thus not described any more here. The certificate validity period confirmation module 160 is configured to confirm whether the validity period of the plurality of pieces of certificate information CI1-CIm expires or not. The display module 170 is configured to display the certificate information CI1-CIm with a first color if the certificate validity period confirmation module 160 determines that the valid period of the certificate information CI1-CIm does not expire, and to display the certificate information CI1-CIm with a second color if determining that the valid period of the certificate information CI1-CIm expires. For instance, the certificate information CI1 is displayed with dark blue when the validity period of the certificate information CI1 does not expire, and the certificate information CI2 is displayed with light blue when the validity period of the certificate information CI2 expires.

Figure 4:
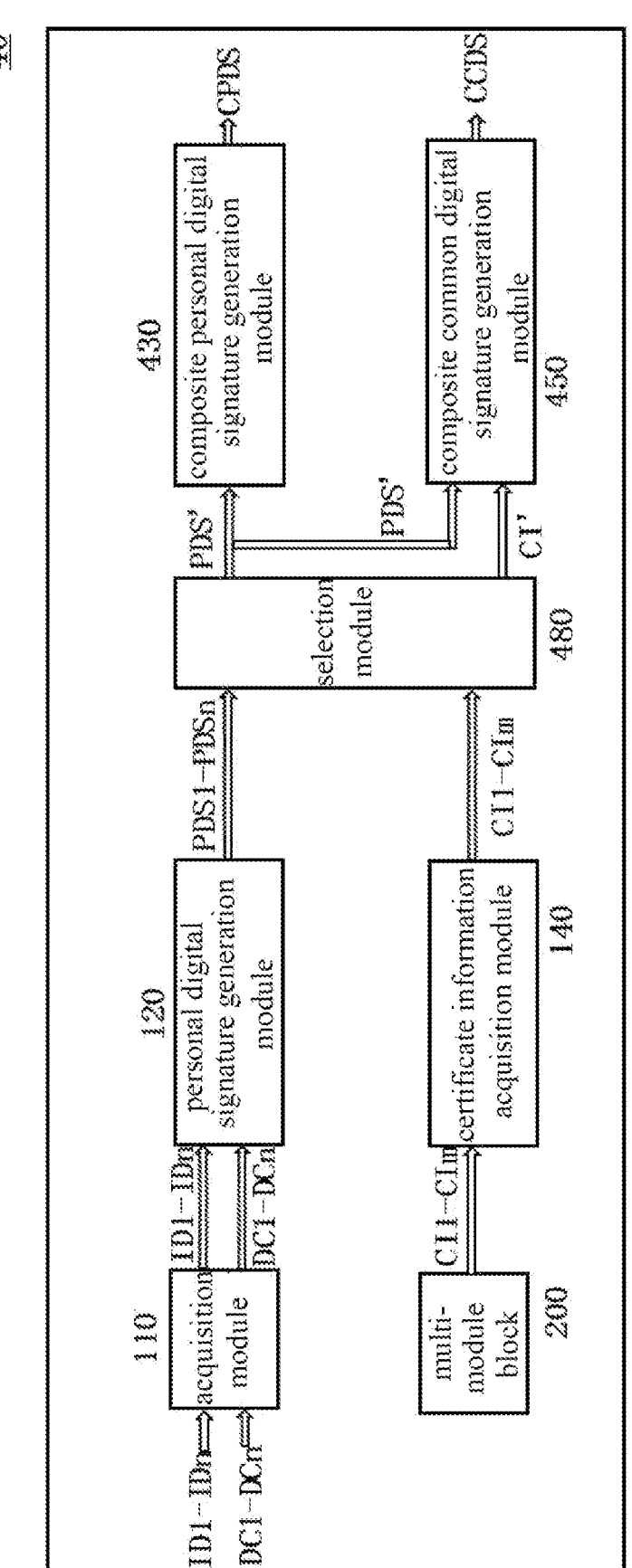
FIG. 4 is a frame diagram showing an electronic signature management system in the fourth embodiment of the present disclosure.

Referring to FIG. 4, FIG. 4 is a frame diagram showing an electronic signature management system in the fourth embodiment of the present disclosure. As shown in FIG. 4, the electronic signature management system 40 includes: an acquisition module 110, a personal digital signature generation module 120, a composite personal digital signature generation module 430, a certificate information acquisition module 140, a composite common digital signature generation module 450, and a selection module 480. The acquisition module 110, the personal digital signature generation module 120, and the certificate information acquisition module 140 in FIG. 4 have the same functions as those of the same modules in FIG. 2, which are thus not described any more here. The selection module 480 is configured to provide a user an interface to choose a required personal digital signature PDS' and/or required certificate information CI' from the plurality of personal digital signatures PDS1-PDSn and the plurality of pieces of certificate information CI1-CIm; and to transfer them to the composite personal digital signature generation module 430 and the composite common digital signature generation module 450; the composite personal digital signature generation module 430 and/or the composite common digital signature generation module 450 generate/generates a composite personal digital signature CPDS and/or the composite common digital signature CCDS according to the personal digital signature PDS' and/or the certificate information CI' selected by the user.

Figure 5:
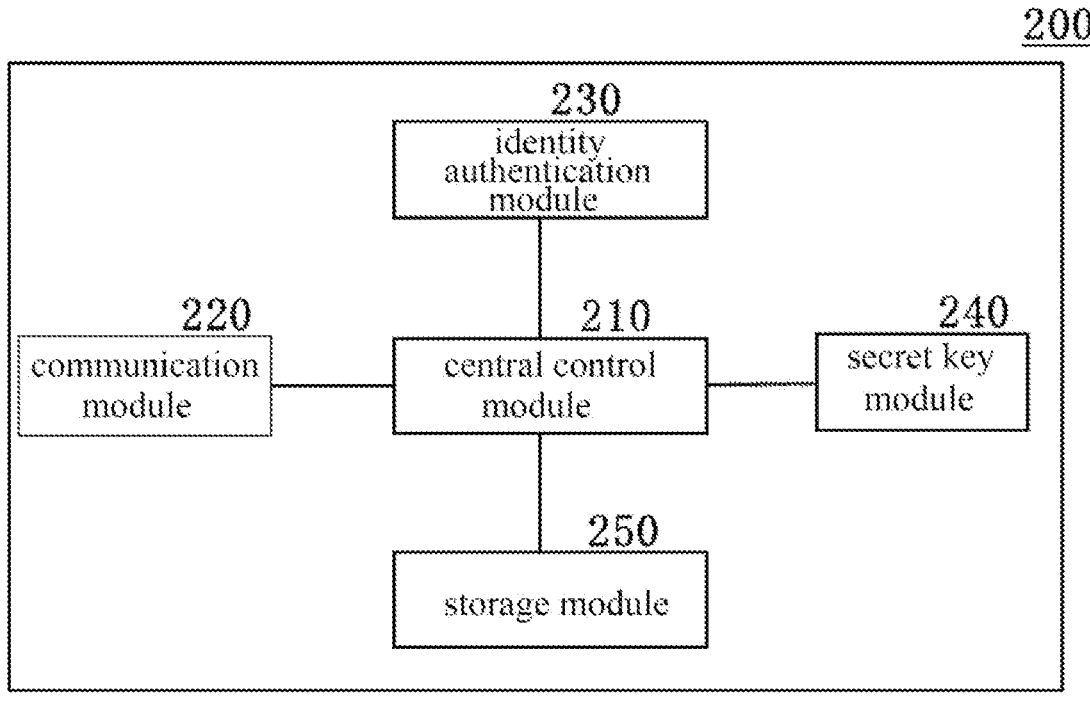
FIG. 5 is a frame diagram showing a multi-module block in FIG. 1-FIG. 4.

Referring to FIG. 5, FIG. 5 is a frame diagram showing a multi-module block 200 in FIGS. 1-4. As shown in FIGS. 1-4, the electronic signature management system 10/20/30/40 further includes a multi-module block 200. As shown in FIG. 5, the multi-module block 200 includes a central control module 210, a communication module 220, an identity authentication module 230, a secret key module 240, and a storage module 250 that are connected to the central control module 210. The communication module 220 is configured to achieve communication with a user and an external server; the identity authentication module 230 is configured to store the plurality of pieces of personal identity information ID1-IDn and to authenticate identity information input by the user according to the plurality of stored personal identity information ID1-IDn, and to authorize the user if the authentication succeeds; the secret key module 240 is configured to store the plurality of pieces of certificate information CI1-CIm and secret keys authorized by a banking system and/or a government system; the storage module 250 is configured to store the plurality of personal digital signatures PDS1-PDSn, the composite personal digital signature CPDS and the composite common digital signature CCDS. The central processing module 210 is configured to receive an input and to control operations of other modules 220-250, and to allow the user to use the plurality of personal digital signatures PDS1-PDSn, the composite personal digital signature CPDS, and/or the composite common digital signature CCDS from the storage module 250 after the user is authorized.

Further, the communication module 220 may include at least one of a 3G communication module, a 4G communication module, a 5G communication module, a WIFI module, an NBIoT module, a bluetooth module, an NFC module and an infrared module; the communication module supports protocols IPV4 and IPV6.

Figure 6:
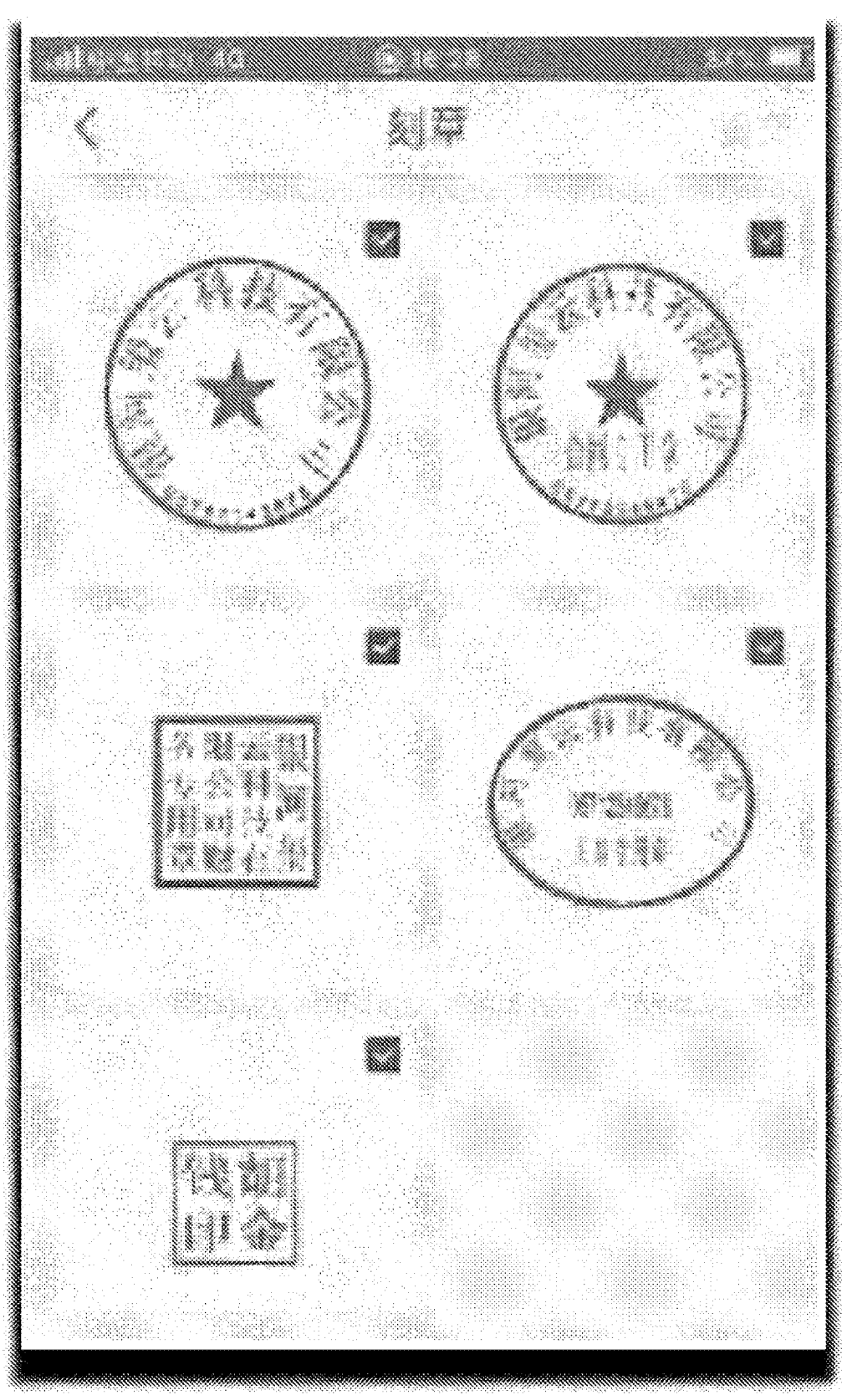
FIG. 6 is a schematic diagram of providing an interface for a user to select a required personal digital signature and required certificate information.
Figure 7:
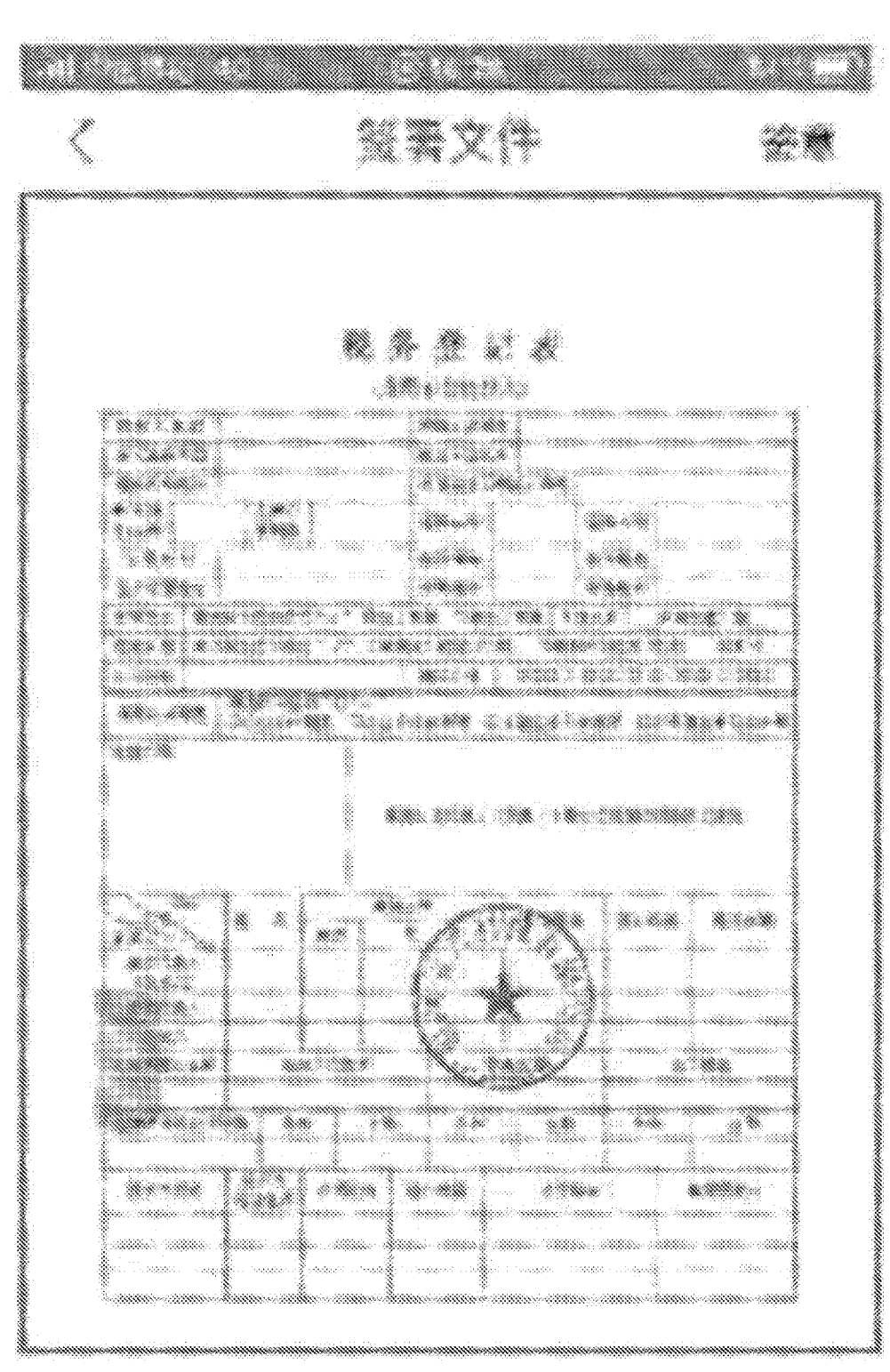
FIG. 7 is a schematic diagram showing that a composite personal digital signature and/or a composite common digital signature generated after user selection in FIG. 6 is stamped on an electronic file.

Referring to FIGS. 6-7. FIG. 6 is a schematic diagram of providing an interface for a user to select a required personal digital signature and required certificate information; and FIG. 7 is a schematic diagram showing that a composite personal digital signature and/or the composite common digital signature generated after user selection in FIG. 6 are stamped on an electronic file. As shown in FIG. 6, the user selects a plurality of personal digital signatures and certificate information in total, and then combines the selected plurality of personal digital signatures and certificate information, by the composite common digital signature generation module 150 of the electronic signature management system, to generate a composite common digital signature, as shown by the composite common digital signature stamped on the electronic file in FIG. 7.

Figure 8:
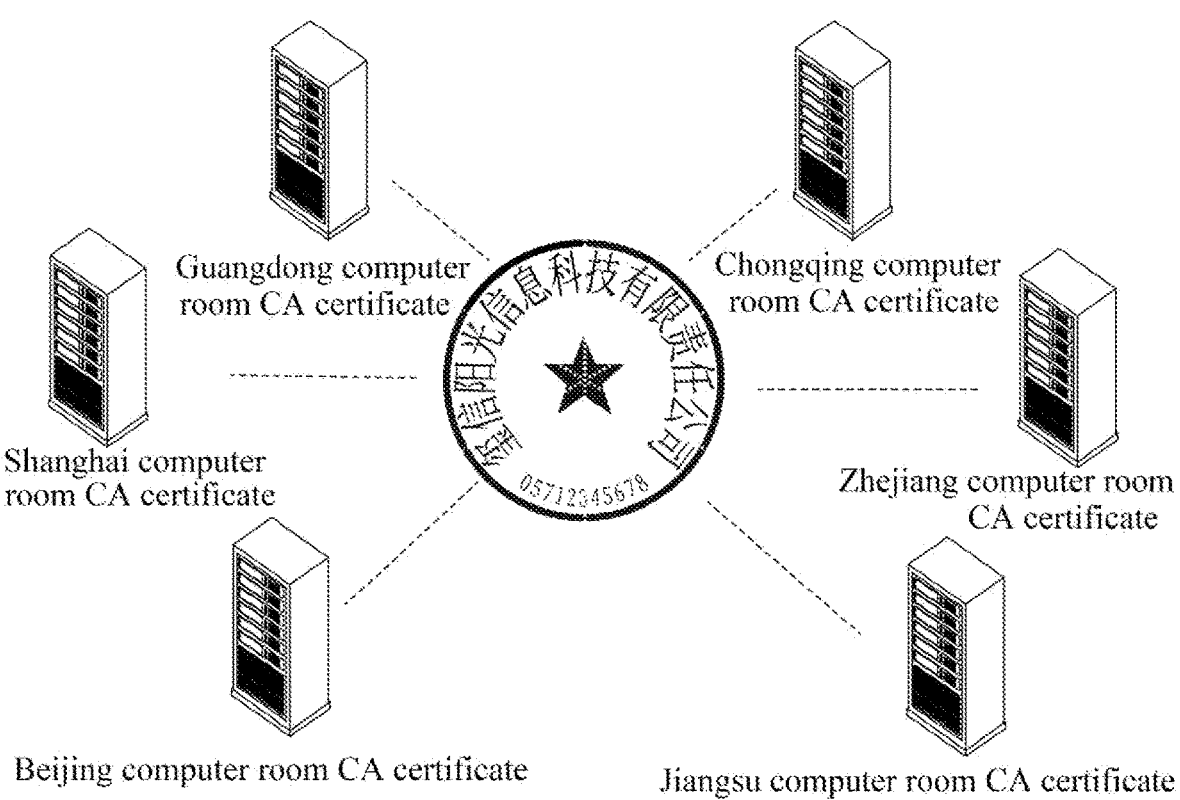
FIG. 8 is a schematic diagram showing a multi-secret key electronic signature management system in an embodiment of the present disclosure.

Referring to FIG. 8, FIG. 8 is a schematic diagram showing a multi-secret key electronic signature management system in an embodiment of the present disclosure. The multi-secret key electronic signature management system may receive and store certificate information authenticated and sent by servers from multiple CA computer rooms, inclusive of Guangdong computer room CA certificate, Shanghai computer room CA certificate, Beijing computer room CA certificate, Jiangsu computer room CA certificate, Zhejiang computer room CA certificate, and Chongqing computer room CA certificate, and finally generate a composite common digital signature. Moreover, the multi-secret key electronic signature management system may further confirm whether the validity period of the CA certificates expires or not using the certificate validity period confirmation module 160. For instance, in this embodiment, the validity period of the Guangdong computer room CA certificate has expired, while other computer room CA certificates do not expire; therefore, the CCDS of this portion is displayed with pink which is light, and CCDS of other portions is displayed with red which is dark.

Figure 9:
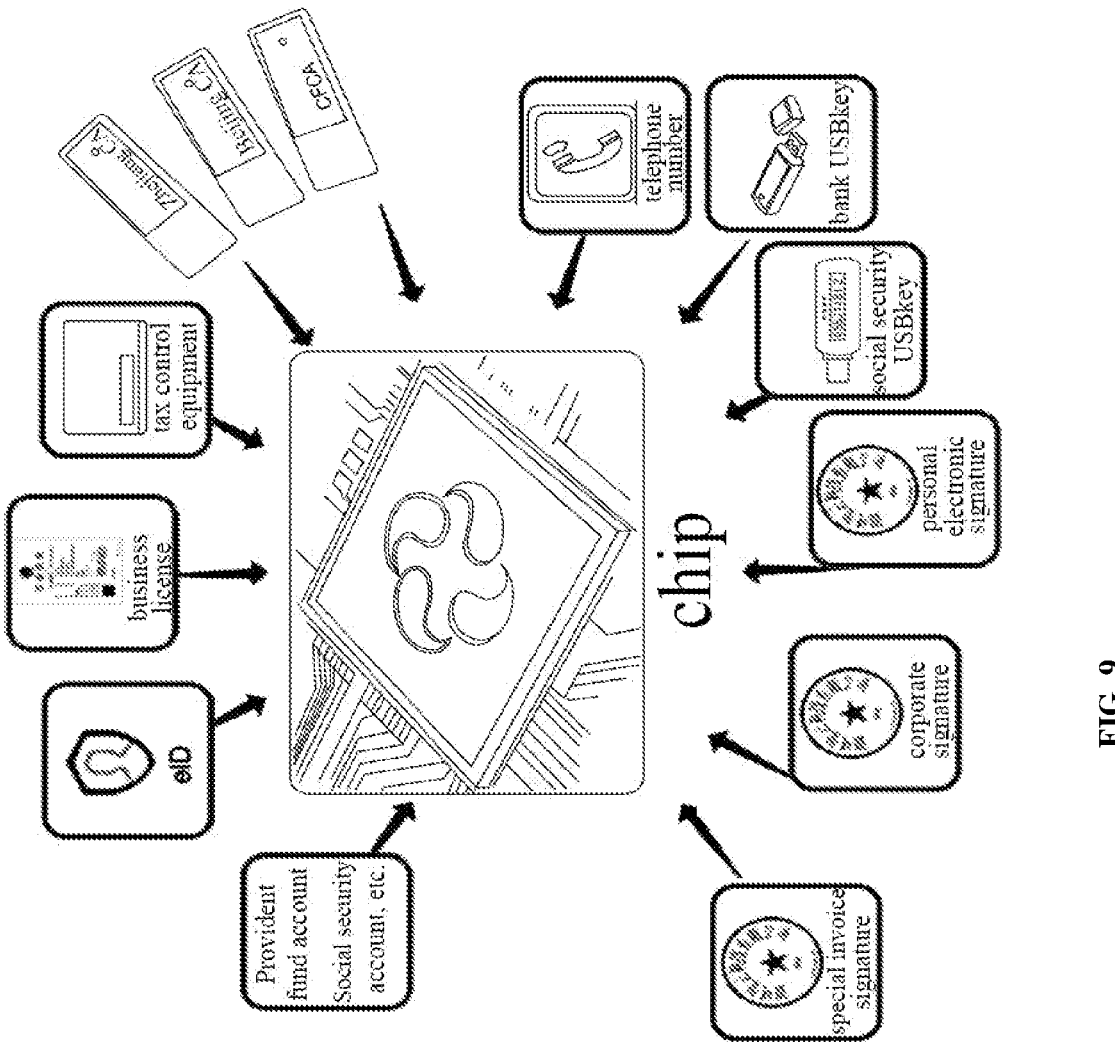
FIG. 9 is a schematic diagram showing a multi-certificate/multi-secret key electronic signature management system in an embodiment of the present disclosure.

Referring to FIG. 9, FIG. 9 is a schematic diagram showing a multi-certificate/multi-secret key electronic signature management system in an embodiment of the present disclosure. As show in FIG. 9, the core function of the multi-certificate/multi-secret key electronic signature management system may be achieved via a chip; the chip is disposed inside a terminal; the multi-certificate/multi-secret key electronic signature management system may receive and store information such as various certificate information, secret keys, personal digital signatures, common digital signature, personal identity information, and digital certificates from a plurality of devices, apparatus and organizations, and then may further generate a composite personal digital signature CPDS and/or a composite common digital signature CCDS according to the user's actual demands.

Referring to FIG. 10, FIG. 10 is a flow chart showing an electronic signature management method in the first embodiment of the present disclosure. Referring to FIGS. 1 and 10, the electronic signature management method in FIG. 10 includes the following steps S110-S130.

In step S110, a plurality of pieces of personal identity information and a plurality of corresponding digital certificates are acquired.

In step S120, a plurality of personal digital signatures are generated according to the plurality of pieces of personal identity information and the plurality of corresponding digital certificates.

In step S130, a composite personal digital signature is generated according to the plurality of personal digital signatures, where the composite personal digital signature includes the plurality of pieces of personal identity information and the plurality of corresponding digital certificates.

It should be noted that step S110 is executed by the acquisition module 110; step S120 is executed by the personal digital signature generation module 120, and step S130 is executed by the composite personal digital signature generation module.

Figure 11:
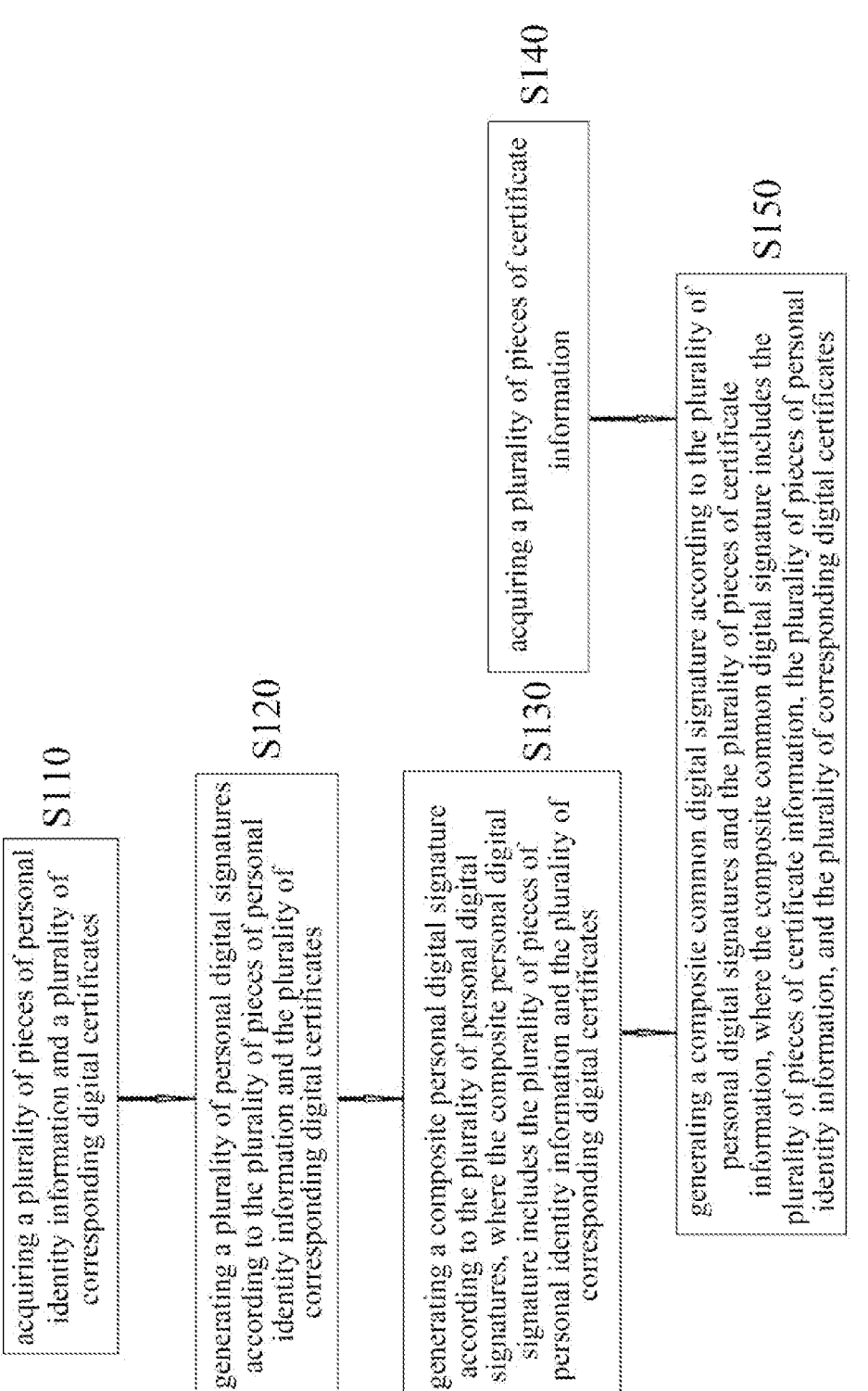
FIG. 11 is a flow chart showing an electronic signature management method in the second embodiment of the present disclosure.

Referring to FIG. 11, FIG. 11 is a flow chart showing an electronic signature management method in the second embodiment of the present disclosure. Referring to FIGS. 2 and 11, the electronic signature management method in FIG. 11 includes the following steps S110-S150.

In step S110, a plurality of pieces of personal identity information and a plurality of corresponding digital certificates are acquired.

In step S120, a plurality of personal digital signatures are generated according to the plurality of pieces of personal identity information and the plurality of corresponding digital certificates.

In step S130, a composite personal digital signature is generated according to the plurality of personal digital signatures, where the composite personal digital signature includes the plurality of pieces of personal identity information and the plurality of corresponding digital certificates.

In step S140, a plurality of pieces of certificate information is acquired.

In step 150, a composite common digital signature is generated according to the plurality of personal digital signatures and the plurality of pieces of certificate information, where the composite common digital signature includes the plurality of pieces of certificate information, the plurality of pieces of personal identity information, and the plurality of corresponding digital certificates.

It should be noted that step S140 is executed by the certificate information acquisition module 140; and step S150 is executed by the composite common digital signature generation module 150.

Referring to FIG. 12, FIG. 12 is a flow chart showing an electronic signature management method in the third embodiment of the present disclosure. Referring to FIGS. 3 and 12, the electronic signature management method in FIG. 12 includes the following steps S110-S170.

In step S110, a plurality of pieces of personal identity information and a plurality of corresponding digital certificates are acquired.

In step S120, a plurality of personal digital signatures are generated according to the plurality of pieces of personal identity information and the plurality of corresponding digital certificates.

In step S130, a composite personal digital signature is generated according to the plurality of personal digital signatures, where the composite personal digital signature includes the plurality of pieces of personal identity information and the plurality of corresponding digital certificates.

In step S140, a plurality of pieces of certificate information is acquired.

In step 150, a composite common digital signature is generated according to the plurality of personal digital signatures and the plurality of pieces of certificate information, where the composite common digital signature includes the plurality of pieces of certificate information, the plurality of pieces of personal identity information, and the plurality of corresponding digital certificates.

In step S160, it is determined whether the validity period of the plurality of pieces of certificate information expires or not.

In step S170, the certificate information is displayed with a first color when it is determined that the validity period of the certificate information does not expire, and the certificate information is displayed with a second color when the validity period of the certificate information expires.

It should be noted that step S160 is executed by the certificate validity period confirmation module 160; and step S170 is executed by the display module 170.

Referring to FIG. 13, FIG. 13 is a flow chart showing an electronic signature management method in the fourth embodiment of the present disclosure. Referring to FIGS. 4 and 13, the electronic signature management method in FIG. 13 includes the following steps S110, S120, S140, S480, S430, S450.

In step S110, a plurality of pieces of personal identity information and a plurality of corresponding digital certificates are acquired.

In step S120, a plurality of personal digital signatures are generated according to the plurality of pieces of personal identity information and the plurality of corresponding digital certificates.

In step S140, a plurality of pieces of certificate information are acquired.

In step S480: an interface is provided for a user to select a required personal digital signature and/or required certificate information from the plurality of personal digital signatures and the plurality of pieces of certificate information.

In step S430, a composite personal digital signature is generated according to the personal digital signatures selected by the user.

In step S450, the composite common digital signature is generated according to the personal digital signatures and certificate information selected by the user.

It should be noted that step S480 is executed by the selection module 480; step S430 is executed by the composite personal digital signature generation module 430, and step S450 is executed by the composite common digital signature generation module 450.

An embodiment of the disclosure discloses a computer-readable storage medium, storing thereon a computer program, which when executed by a processor implements any one of the electronic signature management methods in FIGS. 10-13 described above.

The embodiments of the disclosure provide an electronic signature management method, an electronic signature management system, and a computer-readable storage medium. A request terminal acquires a file to be signed, and uploads the file to be signed and a request message to a central control platform. The central control platform acquires the user's electronic signature from the electronic signature management system to sign the file to be signed and stamp with a timestamp, and then transfers the file to be signed which has been signed and the request information to an audit terminal for approval by an auditor. The audit terminal uploads an approval instruction file and an instruction to the central control platform. The central control platform acquires the auditor's electronic signature from the electronic signature management system or a cloud signature server and signs the approval instruction file, and then transfers the signed approval instruction file together with the instruction to the request terminal. The request terminal uses the instruction to manipulate the electronic signature to sign the file. By setting, certain terminals may also check the signature use information.

The embodiments of the present disclosure described above may be implemented in various hardwares, software coding or a combination of the two. For example, the embodiments of the present disclosure may be a procedure code executing the above method in a digital signal processor (DSP) as well. The present disclosure may further relate to multiple functions executed by a computer processor, a digital signal processor, a microprocessor or a field programmable gate array (FPGA). The above processor may be configured to perform particular task according to the disclosure, which completes the task by performing the machine readable software code or firmware code defining the specific method disclosed herein. The software code or firmware code may be developed into different programming languages and different formats or forms. Software codes may be compiled for different target platforms. However, different code format, type and language for software code executing tasks according to the disclosure and other type of configuration code do not depart from the spirit and scope of the present disclosure.

By means of the above technical solutions, the present disclosure has the following beneficial effects: an individual or enterprise's electronic signature may be saved in a platform or a cloud server of an electronic signature management system; moreover, the electronic signature management system is not centralized managed, which may greatly reduce the risk of information leakage of the electronic signature and bring high security level. In this way, individuals or enterprises may readily supervise usage of their own electronic signatures effectively. Furthermore, individuals or enterprises may get access to the platform or cloud server of the electronic signature management system via a terminal, and then may use the electronic signature readily after being authenticated for request. Especially when a written authorization or certificate needs authorizations/authentications from multiple people or organizations to be provided, the composite personal digital signature or the composite common digital signature of the present disclosure may acquire the authorizations/authentications of all the people or organizations in a fastest and most convenient manner, thereby solving the problem of electronic signature management for individuals or enterprises, and meeting the rapid development demands for modern e-commerce. Moreover, the composite personal digital signature and the composite common digital signature herein may not only be combined together for use, but also be used separately, thereby achieving the purpose of double application.

In this description, specific embodiments are used to describe the principle and implementations of the present disclosure, and the description of the embodiments is only intended to help understand the methods and core idea of the present disclosure. Meanwhile, those skilled in the art may, based on the idea of the present disclosure, make modifications with respect to the specific implementations and the application scope. Therefore, the content of this description shall not be construed as a limitation to the present disclosure.

What is claimed is:

1. An electronic signature management method, comprising the following steps:

acquiring a plurality of pieces of personal identity information and a plurality of corresponding digital certificates;

generating a plurality of personal digital signatures according to the plurality of pieces of personal identity information and the plurality of corresponding digital certificates; and generating a composite personal digital signature according to the plurality of personal digital signatures, wherein the composite personal digital signature comprises the plurality of pieces of personal identity information and the plurality of corresponding digital certificates.

2. The electronic signature management method according to claim 1, wherein the plurality of pieces of personal identity information comprises biological feature information, identity card information, telephone number information, personal signature information, social insurance information, credit investigating information, and/or personal photo information of a user.

3. The electronic signature management method according to claim 1, further comprising:

acquiring a plurality of pieces of certificate information, and generating a composite common digital signature according to the plurality of personal digital signatures and the plurality of pieces of certificate information, wherein the composite common digital signature comprises the plurality of pieces of certificate information, the plurality of pieces of personal identity information, and the plurality of corresponding digital certificates.

4. The electronic signature management method according to claim 3, wherein the plurality of pieces of certificate information comprises important information in business operation selected from the group consisting of electronic license information, tax-control information, juridical person identity information, shareholder information, social insurance information, annual inspection information, team information, intellectual property information, enterprise credit investigating information.

5. The electronic signature management method according to claim 3, wherein the plurality of pieces of certificate information is authenticated and sent by a plurality of corresponding certificate authority servers, and the plurality of pieces of certificate information comprises a corresponding timestamp and a validity period.

6. The electronic signature management method according to claim 5, further comprising:

determining whether the validity period of the plurality of pieces of certificate information expires or not; and displaying the certificate information with a first color when it is determined that the validity period of the certificate information does not expire, and displaying the certificate information with a second color when it is determined that the validity period of the certificate information expires.

7. The electronic signature management method according to claim 3, further comprising:

providing a user with an interface to select a required personal digital signature and/or required certificate information from the plurality of personal digital signatures and the plurality of pieces of certificate information; and generating the composite personal digital signature and/or the composite common digital signature according to the personal digital signature and/or the certificate information selected by the user.

8. The electronic signature management method according to claim 3, further comprising:

providing a central control module, and a communication module, an identity authentication module, a secret key module, and a storage module that are connected to the central control module;

achieving communication with a user and an external server using the communication module;

storing the plurality of pieces of personal identity information using the identity authentication module, authenticating identity information input by the user using the stored plurality of pieces of personal identity information, and authorizing the user if the authentication succeeds;

storing the plurality of pieces of certificate information and secret keys authorized by a banking system and/or a government system using the secret key module;

storing the plurality of personal digital signatures, the composite personal digital signature, and the composite common digital signature using the storage module; and receiving an input and controlling operations of other modules using the central processing module, and allowing, after the user is authorized, the user to use the plurality of personal digital signatures, the composite personal digital signature, and/or the composite common digital signature from the storage module.

9. The electronic signature management method according to claim 3, wherein for the composite personal digital signature, if a first portion of the plurality of digital certificates is sealed up and a second portion thereof is opened for consent in an application layer, this indicates that people in the first portion do not consent and people in the second portion consent; and if all the plurality of digital certificates are opened for consent in the application layer, this indicates that all the people in the first portion and in the second portion consent;

for the composite common digital signature, if a first portion of the plurality of digital certificates is sealed up and a second portion thereof is opened for consent in an application layer, this indicates that people in the first portion do not consent and people in the second portion consent; if all the plurality of digital certificates are opened for consent in the application layer, this indicates that all people in the first portion and in the second portion consent; if a third portion of the plurality of pieces of certificate information is sealed up and a fourth portion thereof is opened for consent in the application layer, this indicates that certificate information in the third portion is not valid and certificate information in the fourth portion is valid; and if all the certificate information are opened for consent in the application layer, this indicates that all the certificate information are valid.

\* \* \* \* \*